UNITED STATES PATENT OFFICE.

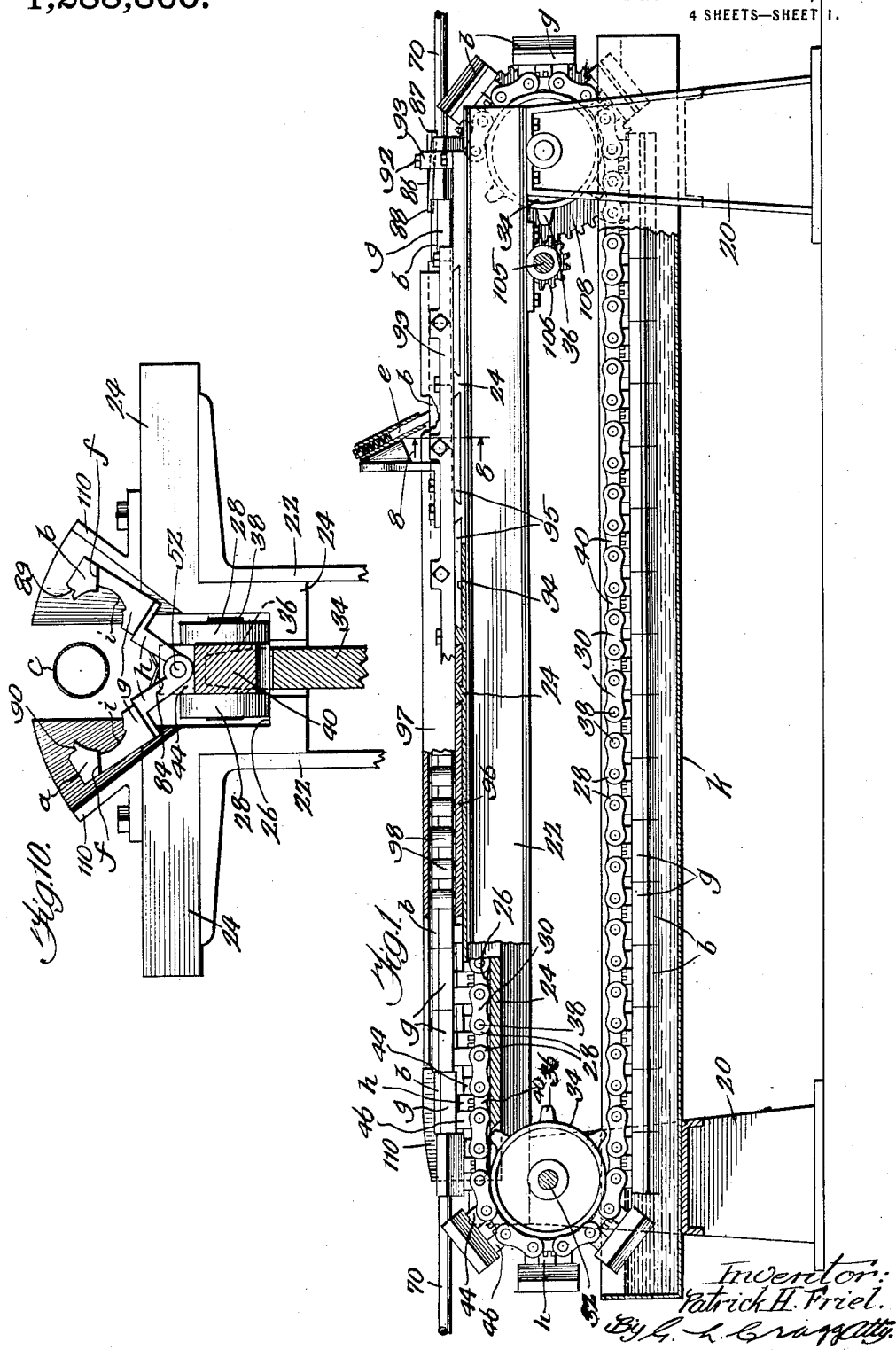

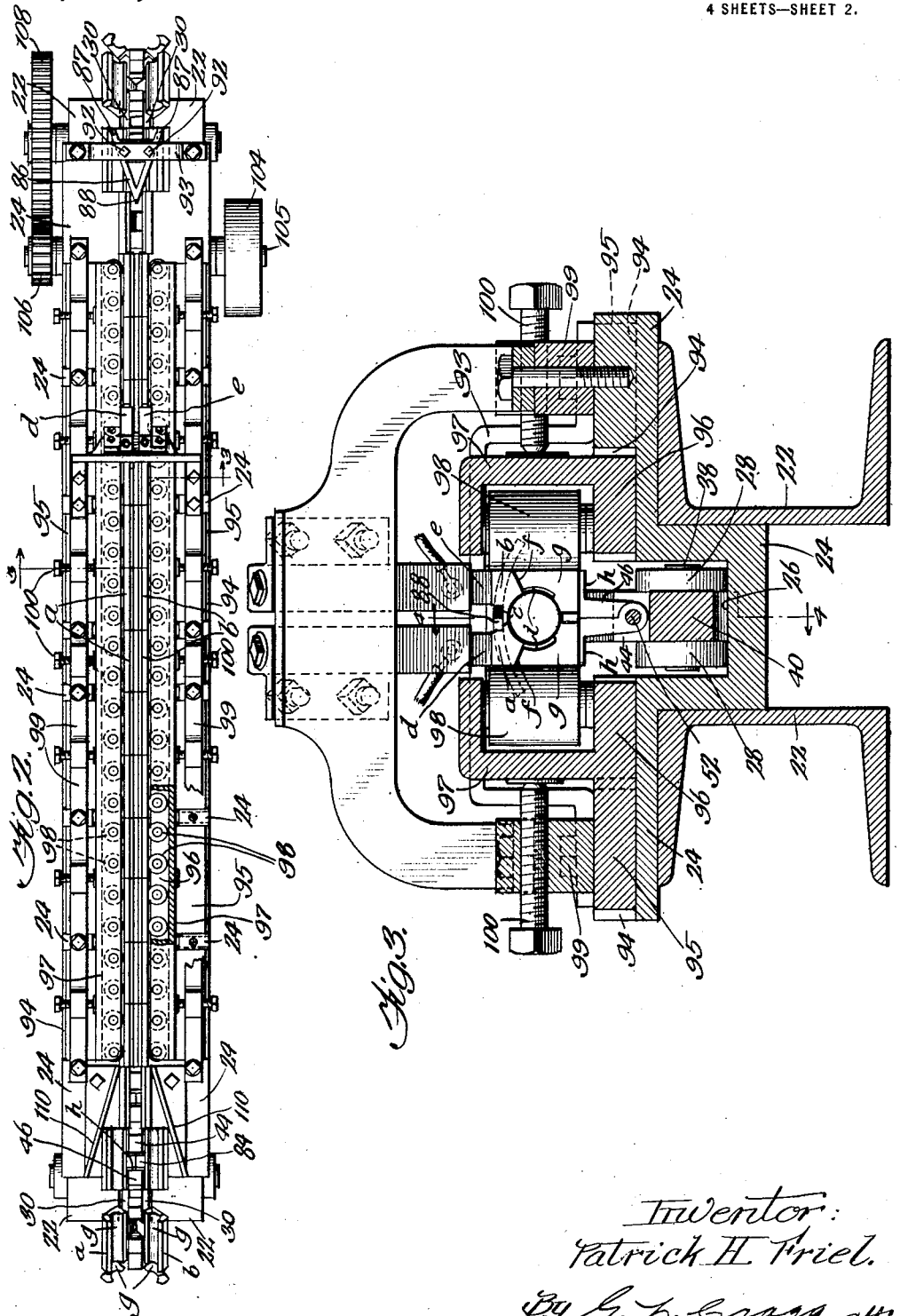

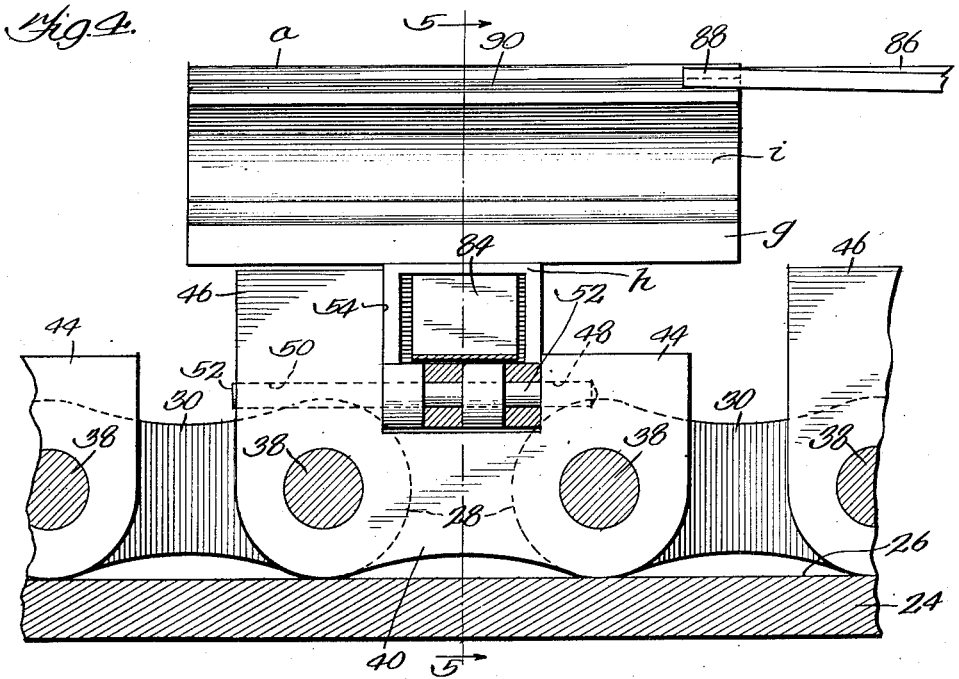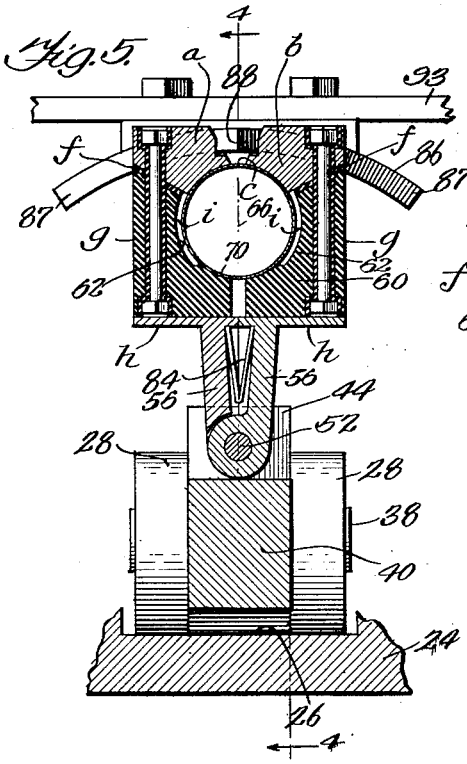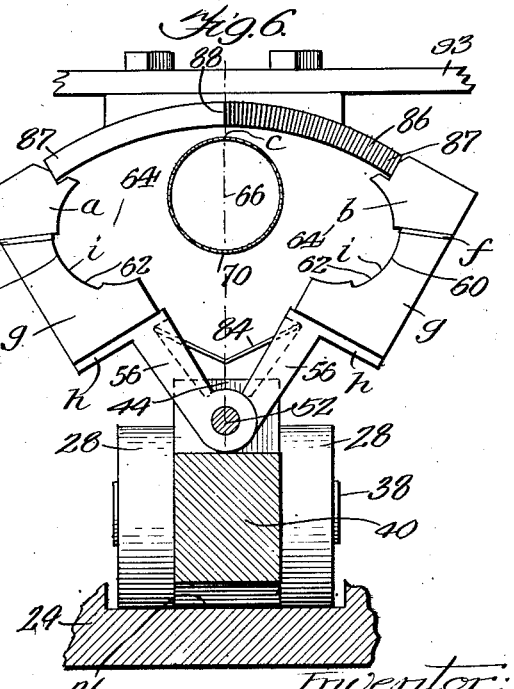

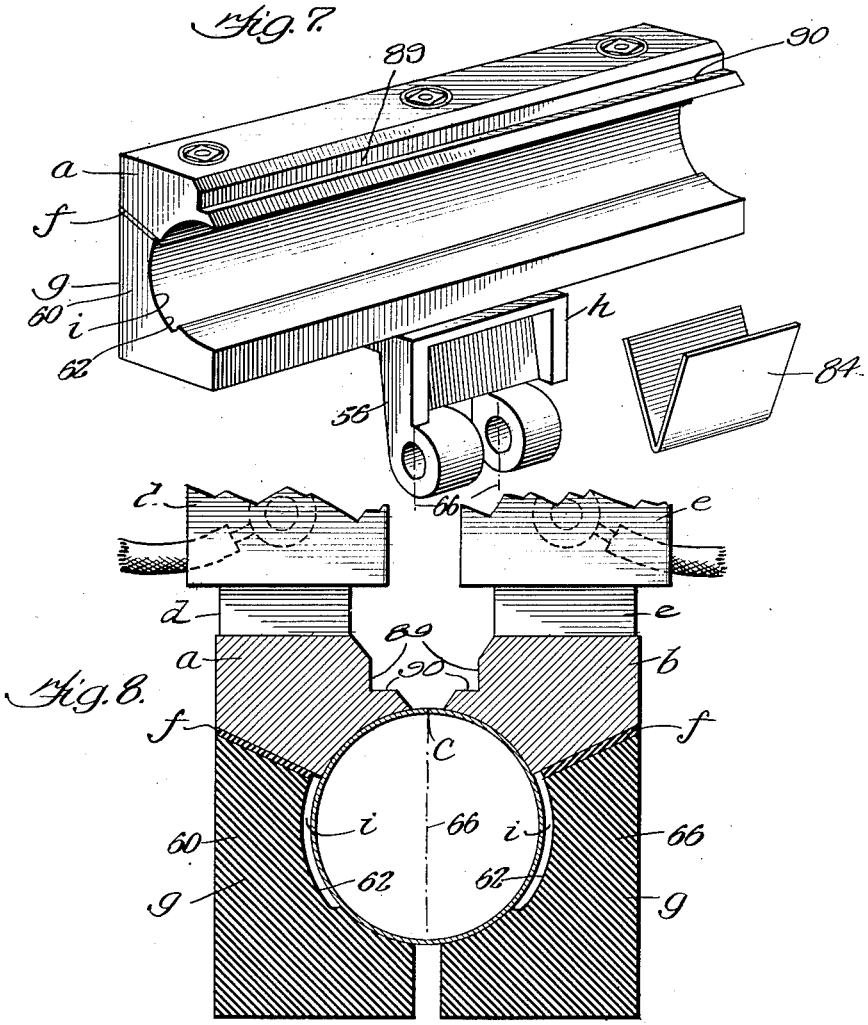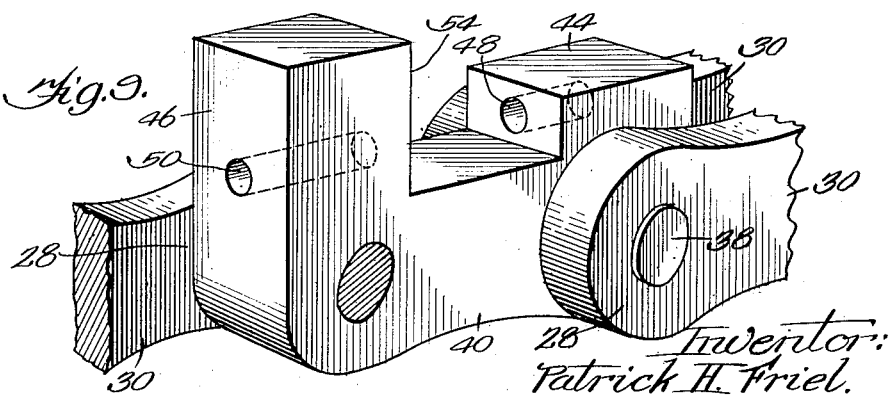

PATRICK H. FRIEL, OF KENOSHA, WISCONSIN; HATTIE D. FRIEL ADMINISTRATOR OF SAID PATRICK H. FRIEL, DECEASED.

WELDING APPARATUS.

1,288,866.   Specification of Letters Patent.   Patented Dec. 24, 1918.

Application filed October 5, 1916, Serial No. 123,802.   Renewed October 21, 1918.   Serial No. 259,141.

*To all whom it may concern:*

Be it known that I, PATRICK H. FRIEL, a citizen of the United States, residing at Kenosha, in the county of Kenosha and State of Wisconsin, have invented a certain new and useful Improvement in Welding Apparatus, of which the following is a full, clear, concise, and exact description, reference being had to the accompanying drawings, forming a part of this specification.

My invention relates to welding or uniting apparatus for joining iron or other metallic parts and has for one of its objects the provision of mechanism whereby welding or union may be effected while the articles or parts being welded or united are in transit, and has for another of its objects the provision of means whereby welding implements may be periodically cooled. The welding is preferably electrically effected.

One of the uses to which my invention has been put is the welding of the seams in tubing formed of rolled sheet iron or steel and in practising my invention when applied to this use I make use of the gripping mechanism, that is used for drawing the tubing from the machine that forms it, as a part of the welding apparatus. After this gripping mechanism has performed its function in drawing the tubing as far as it is designed to do I immerse the gripping jaws of the gripping mechanism in water or other cooling fluid.

I will fully describe my invention by reference to the accompanying drawings showing the adaptation thereof in an apparatus that is employed for drawing or transferring hollow tubing from one place to another, as for example, from a tube forming machine. In the drawings:

Figure 1 is a side elevation partially in section of mechanism illustrating this invention in its preferred form, in the act of drawing a tube.

Fig. 2 is a plan view of the mechanism shown in Fig. 1, the tube being omitted to facilitate illustration.

Fig. 3 is an enlarged sectional detail end view on the irregular line 3—3 of Fig. 2.

Fig. 4 is a central enlarged view taken on the line 4—4 of Fig. 3, and on the line 4—4 of Fig. 5.

Fig. 5 is a sectional end view on the line 5—5 of Fig. 4, showing the tube gripping jaws closed.

Fig. 6 is a changed position view of the parts shown in Fig. 5, showing the gripping jaws open.

Fig. 7 is a perspective view illustrating one of the jaws and a spring for coöperation therewith.

Fig. 8 is a sectional view on line 8—8 of Fig. 1.

Fig. 9 is a perspective view of certain parts of the drive chain showing particularly the construction of a link designed to facilitate positive driving of the gripping jaws.

Fig. 10 is a view, partially in cross section and partially in elevation, of the upper portion of the machine.

Like parts are indicated by similar characters of reference throughout the different figures.

I will first describe the structure illustrated when used as a tube drawing or transferring machine and will thereafter describe my welding mechanism and means for cooling the same.

The machine illustrated is supported upon one side upon standards 20 spaced apart by any suitable rigid members not interfering with the operative parts of the machine, and particularly by the channel irons 22 spaced apart as shown in Fig. 3 to receive the specially formed U-shaped girder 24 having in its upper surface a track 26 within which the enlarged primary link ends 28 of the primary chain links 30 slide. Journaled in the end standards 20, heretofore described, are shafts 32 and 33, the latter driven by any suitable source of power 106. Each such shaft carries a sprocket wheel 34, provided in the ordinary manner with teeth 36 adapted to mesh with the primary links 30 of the chain, to be hereafter more fully described, and propel it so that the upper portion of the chain travels from right to left along the track 26 when the machine is viewed in Fig. 1.

The chain is made up of pairs of primary links 30, heretofore described, placed side by side and provided with suitable pivot pins 38 in their opposite ends in the ordinary manner. Between each successive pair of primary links and journaled on such pivot pins 38 is an intermediate link 40, shown in great detail in Fig. 9.

The upper half of each intermediate link is specially formed as shown in Fig. 9 so as to provide two upwardly rising blocks or lugs 44 and 46, each being of sufficient height to provide openings therein marked respectively 48 and 50 through which the hinge pin 52 of the gripping jaws, to be hereafter described, may pass. The block or lug 46 is substantially higher than is required merely to provide sufficient bearing for such hinge pin, thus providing a bearing surface 54 of substantial size against which the gripping jaws or parts thereof may take bearing and be supported when the fully equipped chain is moved to the right, as viewed in Fig. 9.

Pivoted on the hinge pin 52, which, as above indicated, is inserted through the parts 44 and 46 of each link 40, and between such blocks 44 and 46 are a pair of hinge arms 56 terminating at their outer ends in clamping jaws 60, clearly shown in perspective in Fig. 7. Each pair of clamping jaws 60 interfit together, as is clearly shown in Fig. 5, and each such jaw 60 is recessed in the semi-circular line 62 whose center of curvature is at 64. The center of curvature just described lies in the plane of contact 66 between the adjacent jaws 60, which plane also includes the center of pivot pin 52, heretofore described, the result being that when a tube 70 or other article to be worked upon is placed in position, shown in Figs. 5 and 6, the jaws 60 may be freely moved backward and forward between the positions in which they appear in Figs. 5 and 6 without, in any position, interfering with the tube or having their movement interfered with by the tube.

The jaws 60 are urged from the position of Fig. 5 toward the open position of Fig. 6 by a spring 84 of any suitable construction, located at any convenient point.

In order to insure positive opening of the jaws 60 at the proper point in the travel of the chain bearing all the parts just described, a triangular curved separator 86 may be, if desired, secured in position as shown in several of the figures, having inclined cam surfaces 87 terminating in a point 88 adapted to engage the sides 89 of a suitably formed recess 90 formed in the central top portion of each clamping jaw 60. In the particular machine here illustrated, the separator 86 is secured in position by the bolt 92 passing through a fixed part of the machine 93.

Cut transversely of the machine in member 24 are suitably placed and arranged dove-tail slots 94 within which slide dove-tail members 95 depending from the long horizontal plates 96 carrying yokes 97 in which are journaled a plurality of rollers 98. Rigidly attached to member 24 are parallel bars 99 in which are placed screws 100 adapted to adjustably bear upon the yokes 97 and thus force the rollers 98 inward toward the center of the machine, and against the outer vertical faces of the gripping jaws 60, heretofore described. By adjusting the screws 100 in and out the pressure of the rollers 98 on the jaws 60 may be varied.

The shaft 33 is driven by any suitable power attached to a pulley 104 on a shaft 105 carrying a pinion 106 meshing with a gear 108 on shaft 33. Any other suitable means for driving this shaft may be applied without departing from this invention.

At the left hand or entrance end of the machine, as illustrated in the drawings, are placed two converging cam tracks 110 between which the gripping jaws 60 pass before entering the space between the rollers 98 for the purpose of closing the gripping jaws upon the tube 70 preparatory to the jaws being rigidly compressed by the rollers 98 on the tube, thus insuring their taking hold of the tube for the purpose of drawing, as will more fully appear hereafter.

Each successive pair of jaws 60 coming from the bottom of the chain, as viewed in Fig. 1, strikes the cam tracks 110 and are forced together against the action of their spring 84. From these cam tracks 110 the particular pair of gripping jaws 60 in question pass between the rollers 98 and travel between them through the machine until after leaving the last pair of rollers 98, they engage the point 88 of the triangular cam member 86, which, as heretofore described, separates the jaws 60 notwithstanding any friction which may prevent spring 84 from separating them, as it should, whereupon such open pair of jaws pass down wheel 34 at the right hand end of the machine, thence in open position along the bottom of the machine, and finally return to cam tracks 110 for the repetition of the operation just described. In feeding tubes or other articles to be drawn to the machine, the free end of the tube is placed in proximity to the position of the jaws 60 as they are just ready to pass through the cam tracks 110, thus closing the jaws 60 upon the end of the tube. The tube is now moved by hand in this position to the right into the machine until the first pair of rollers, and possibly the second pair, have gripped the jaws 60, whereupon the power in the chain device is sufficient to draw the tube through the machine just as long as there is any tube to be drawn furnished by the manufacturing machine (not shown) placed at the left of the machine shown.

The gripping jaws are fastened to the chain drive and are hinged thereto in such a way that they may be moved into and out of different relations with reference to the tube or other product to be worked upon without interfering therewith, thus greatly reducing the number of parts heretofore required in devices of this class. Furthermore, the gripping jaws open automatically under spring action which is rendered positive by the use of the cam device 86, and the pressure of the gripping jaws is adjustable through the use of the adjusting screws 100.

The gripping or clamping jaws of each clamp carry or are provided with a pair of terminals $a$ $b$, one terminal being provided upon each jaw, these terminals traveling with the pipe that is pulled by the clamps. The terminals face each other in the presence of the butt joint $c$ formed by the opposing and engaged edges of the curled sheet forming the pipe. A pair of stationary current conveying brushes or contacts $d$ and $e$ are provided and against which each pair of contacts or terminals $a$ $b$ successively rub as they travel. The pipe engaging clamps are placed in very close succession, each clamp being desirably touched by its preceding and succeeding neighbor when holding the pipe. By this arrangement the butt seam $c$ is welded continuously from end to end of the pipe.

In the preferred embodiment of the invention the clamping jaws are of composite formation, each jaw including an upper copper portion to constitute the terminal $a$ or $b$, a body of mica $f$ between each terminal and the base portions of the corresponding clamp jaw, and a base portion $g$ of fiber that is mounted upon the support $h$ carried by the parts of the clamp jaws that are directly hinged together. The fiber portions $g$ are desirably recessed at $i$ so as to prevent the heat in the pipe from materially affecting the fiber bodies $g$. The contacts or brushes $d$ $e$ are desirably located near the place where the clamps are disengaged from the tube or pipe so that the heat from the pipe will not have much opportunity to travel to the fiber bodies $g$. I desirably provide a basin $k$ into which the clamps dip after they leave the tube or pipe, this basin $k$ containing cooling fluid in which the copper terminals $a$ $b$ are immersed. By means of the basin $k$ cool clamping jaws are presented to the pipe when being brought into engagement therewith, these clamping jaws (or the copper portions $a$ $b$ thereof) being only heated when near the end of their journey.

Mechanism for drawing articles, similar to the article drawing mechanism herein shown but minus the arrangement for welding, forms the subject matter of my copending application Serial No. 117,386, filed August 28, 1916.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a clamp for application to object portions to be welded; means for effecting the travel of said clamp and thereby of the object portions engaged thereby; terminals carried by the clamp, one upon each jaw thereof, for establishing the flow of welding heat producing electric current in the presence of object portions to be welded; and current conveying brushes against which said terminals rub as they travel.

2. The combination with a clamp for application to object portions to be welded and inclusive of two jaws; of means for effecting the travel of the clamp and object portions to which it is applied; terminals carried by the clamp, one upon each jaw thereof, for establishing the flow of welding heat producing electric current in the presence of object portions to be welded; and current conveying brushes against which said terminals rub as they travel.

3. The combination with a clamp for application to object portions to be welded; means for effecting the travel of said clamp and thereby of the object portions engaged thereby; terminals carried by the clamp for establishing the flow of welding heat producing electric current in the presence of object portions to be welded; and current conveying brushes against which said terminals rub as they travel.

4. The combination with a clamp for application to object portions to be welded; of means for effecting the travel of the clamp and object portions to which it is applied; terminals carried by the clamp for establishing the flow of welding heat producing electric current in the presence of object portions to be welded; and current conveying brushes against which said terminals rub as they travel.

5. The combination with a clamp for application to object portions to be welded; means for effecting the travel of said clamp and thereby of the object portions engaged thereby; and terminals carried by the clamp, one upon each jaw thereof, for establishing the flow of welding heat producing electric current in the presence of object portions to be welded.

6. The combination with a clamp for application to object portions to be welded and inclusive of two jaws; of means for effecting the travel of the clamp and object portions to which it is applied; and terminals carried by the clamp, one upon each jaw thereof, for establishing the flow of welding heat producing electric current in the presence of object portions to be welded.

7. The combination with a clamp for application to object portions to be welded; means for effecting the travel of said clamp and thereby of the object portions engaged thereby; and terminals carried by the clamp for establishing the flow of welding heat producing electric current in the presence of object portions to be welded.

8. The combination with a clamp for application to object portions to be welded; of means for effecting the travel of the clamp and object portions to which it is applied; and terminals carried by the clamp for establishing the flow of welding heat producing electric current in the presence of object portions to be welded.

9. The combination with a pair of terminals for establishing the flow of welding heat producing electric current; of means for causing the travel of such terminals and object portions to be welded in the presence of each other and in the same direction whereby such object portions may be welded while in transit.

10. The combination with a pair of terminals for establishing the flow of welding heat producing electric current; of means for progressively changing the place of passage of such current and causing object portions to travel in the presence of the welding heat produced by such current.

11. The combination with means for effecting the travel of metal objects; of means for effecting the passage of welding heat producing electric current in the presence of moving object portions to weld the same and inclusive of traveling and stationary circuit continuing portions.

12. The combination with means for effecting the travel of metal objects; of means for effecting the passage of welding heat producing electric current in the presence of moving object portions to weld the same and inclusive of circuit continuing portions that are in moving relation with each other and one of which moves in the direction of travel of the object portions being welded.

13. The combination with means for effecting the travel of metal objects; of means moving in the direction of travel of the object portions being welded for effecting the passage of welding heat producing electric current in the presence of moving object portions to weld the same.

14. The combination with means for effecting the travel of metal objects; of means for effecting the passage of welding heat producing electric current in the presence of moving object portions to weld the same.

15. The combination with means for effecting the travel of metal objects; of means for producing welding heat in close proximity to objects while in transit to weld moving object portions.

16. The combination with a plurality of closely approximated clamps; of means for effecting their travel while they engage object portions; terminals carried by said clamps for establishing the flow of welding heat producing electric current in the presence of object portions to be welded; and terminal engaging contacting means successively engaged by the terminals.

17. The combination with a plurality of closely approximated clamps; means for effecting their travel while they engage object portions; and means carried by said clamps for establishing the flow of welding heat producing electric current in the presence of object portions to be welded.

18. The combination with means for establishing the flow of welding heat producing electric current; of means for effecting the travel of the aforesaid means; and a cooling agency to which the first aforesaid means are brought.

19. The combination with a welding means, of cooling means; and means for effecting the travel of the welding means to the cooling means.

20. The combination with means for producing welding heat and progressively changing the locality thereof; of means for causing objects that are to be welded to travel in the presence of the welding heat.

21. The combination with means for effecting the travel of objects; of traveling means for effecting union between moving object portions while in transit and moving therewith.

In witness whereof, I hereunto subscribe my name this 28th day of September, A. D. 1916.

PATRICK H. FRIEL.

Witnesses:
G. M. SKIDD,
R. H. JONES.